United States Patent
Rupp (10) Patent No.: US 11,359,850 B2
(45) Date of Patent: Jun. 14, 2022

(54) MOTOR COOLING SYSTEMS FOR ICE SHAVERS

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 140 days.

(21) Appl. No.: 16/568,200

(22) Filed: Sep. 11, 2019

(65) Prior Publication Data

US 2020/0109887 A1   Apr. 9, 2020

Related U.S. Application Data

(60) Provisional application No. 62/729,899, filed on Sep. 11, 2018.

(51) Int. Cl.
  *F25C 5/12* (2006.01)
  *A23G 9/04* (2006.01)
  *F01P 5/06* (2006.01)

(52) U.S. Cl.
  CPC .............. *F25C 5/12* (2013.01); *A23G 9/045* (2013.01); *F01P 5/06* (2013.01)

(58) Field of Classification Search
  CPC .......... A23G 9/224; A23G 9/045; A23G 9/28; A23G 9/22; A23G 9/281; F01P 5/06; F25C 5/12; F25C 5/02; B02C 18/2216; B02C 18/2291; Y10S 241/17; B67D 3/0009; B67D 1/16; H02K 9/06; H02K 5/20; F25D 21/14; F25D 2321/1411; F25D 23/003
  See application file for complete search history.

(56) References Cited

U.S. PATENT DOCUMENTS

| | | | | |
|---|---|---|---|---|
| 2,665,852 A | * | 1/1954 | Shively | F25C 5/02 241/257.1 |
| 3,508,715 A | * | 4/1970 | Erickson | B02C 18/12 241/186.2 |
| 5,273,358 A | * | 12/1993 | Byrne | H02K 5/20 366/205 |
| 5,816,455 A | * | 10/1998 | Alpers | A23G 9/283 222/388 |

(Continued)

*Primary Examiner* — Frantz F Jules
*Assistant Examiner* — Martha Tadesse
(74) *Attorney, Agent, or Firm* — Terrence J. Edwards; TechLaw Ventures, PLLC (57) ABSTRACT

Apparatuses, methods, and systems for cooling the motor of a frozen confection machine during operation are described. A frozen confection machine has a blade assembly for shaving ice and a housing comprising an air inlet and an air outlet. The machine has a motor disposed in the housing and is attached to a drive shaft for bringing ice into contact with the blade assembly. The machine also includes a drip tray and a heat sink that is in mechanical contact with the drip tray. The machine uses a fan assembly to causes airflow to move into the housing across the heat sink and past the motor for cooling the motor. During use, the airflow cools the motor to prolong motor life and enhance performance. The heat sink may be integrated with the tray or may be a standalone heat sink. The heat sink may have fins or other structures to increase thermal transfer. The airflow may be passively created by convection or enhanced by a fan or otherwise.

20 Claims, 9 Drawing Sheets

(56) References Cited

U.S. PATENT DOCUMENTS

| | | | |
|---|---|---|---|
| 6,824,013 B2* | 11/2004 | Harrison | B05B 11/0002 |
| | | | 222/66 |
| 9,233,829 B2* | 1/2016 | Grampassi | A23G 9/22 |
| 11,083,327 B2* | 8/2021 | Deleo | A47J 31/407 |
| 2002/0043070 A1* | 4/2002 | Bedard | B67D 1/0043 |
| | | | 62/3.64 |
| 2004/0221608 A1* | 11/2004 | Jablonski | B67D 1/16 |
| | | | 62/344 |
| 2009/0145138 A1* | 6/2009 | Ethier | F25D 31/007 |
| | | | 62/255 |
| 2015/0374729 A1* | 12/2015 | Glauber | A61K 31/7004 |
| | | | 206/572 |
| 2019/0212018 A1* | 7/2019 | Kim | F24F 13/06 |

* cited by examiner

MOTOR COOLING SYSTEMS FOR ICE SHAVERS

CROSS-REFERENCE TO RELATED APPLICATIONS

This application claims the benefit of U.S. Provisional Application No. 62/729,899 filed Sep. 11, 2018, and is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH AND DEVELOPMENT

Not Applicable.

BACKGROUND

Frozen confections such as snow cones and shaved ice are increasingly popular desserts. These desserts include ice that has been conditioned to provide a fluffy or snow-like texture and appearance. There are known different machines for conditioning ice into a snow-like texture, and these machines typically include a blade assembly that is driven by an electric motor. In some machines, the motor draws a high amperage to produce the necessary torque to condition the ice. This high load on the motor generates significant heat and can shorten the life of the motor. Further, the heat generated by the motor can be misdirected such that the ice is melted and is no longer usable.

Therefore, in some implementations, it is desirable to efficiently cool the motor to lengthen the life of the motor and reduce the likelihood of melted ice. In light of the foregoing, disclosed herein are systems, methods, and devices for cooling a motor.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Disclosed herein are systems, methods, and devices for cooling a motor of a frozen confection machine. An embodiment of the disclosure provides cooled airflow to the motor to ameliorate heat generated by the motor. The disclosed means for cooling the motor provide an efficient means to cool the motor and thereby extend the life of the motor. Further, the systems, methods, and devices disclosed herein reduce the risk that heat generated by the motor is misdirected within the frozen confection machine and causes ice to melt.

In an embodiment, the motor is cooled by passing cool air over the motor. The cooled airflow is captured by leveraging the chilled or frozen water that collects in a drip tray of the frozen confection machine. In an embodiment, a heat sink is formed as a component of, or an integral part of, the drip tray on the frozen confection machine. The drip tray collects waste ice and stray ice shavings that are ejected from the frozen confection machine during use. The heat sink may be disposed within the drip tray such that the heat sink is cooled by the waste ice and stray ice shavings and generates cooled air. The cooled air generated by the heat sink may be passed over the motor to cool the motor during operation.

In an embodiment, a frozen confection machine includes a blade assembly and a motor for actuating one or more components of the blade assembly. The blade assembly may include a blade and a paddle for feeding ice into the blade. In an embodiment, the motor spins a drive shaft that is in mechanical contact with the paddle and thereby the motor feeds ice into the blade. The motor may be disposed in a housing of the frozen confection machine The frozen confection machine further includes a drip tray for collecting ice shavings and a heat sink that is integrated into the drip tray and/or in mechanical contact with the drip tray. The frozen confection machine includes a fan assembly for drawing air into a housing of the frozen confection machine and further for pushing air out of the housing of the frozen confection machine.

In an embodiment, a frozen confection machine includes a blade assembly for shaving ice and a housing comprising an air inlet and an air outlet. The machine includes a motor disposed in the housing and is attached to a drive shaft for bringing ice into contact with the blade assembly. The machine further includes a drip tray and a heat sink that is in mechanical contact with the drip tray. The machine uses a fan assembly to causes airflow to move into the housing across the heat sink and past the motor for cooling the motor. During use, the airflow cools the motor to prolong motor life and enhance performance. The heat sink may be integrated with the tray or may be a standalone heat sink. The heat sink may have fins or other structures to increase thermal transfer. The airflow may be passively created by convection or enhanced by a fan or otherwise.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the systems, methods, and devices for providing cooled airflow to a motor of a frozen confection machine are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting because the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 1A:
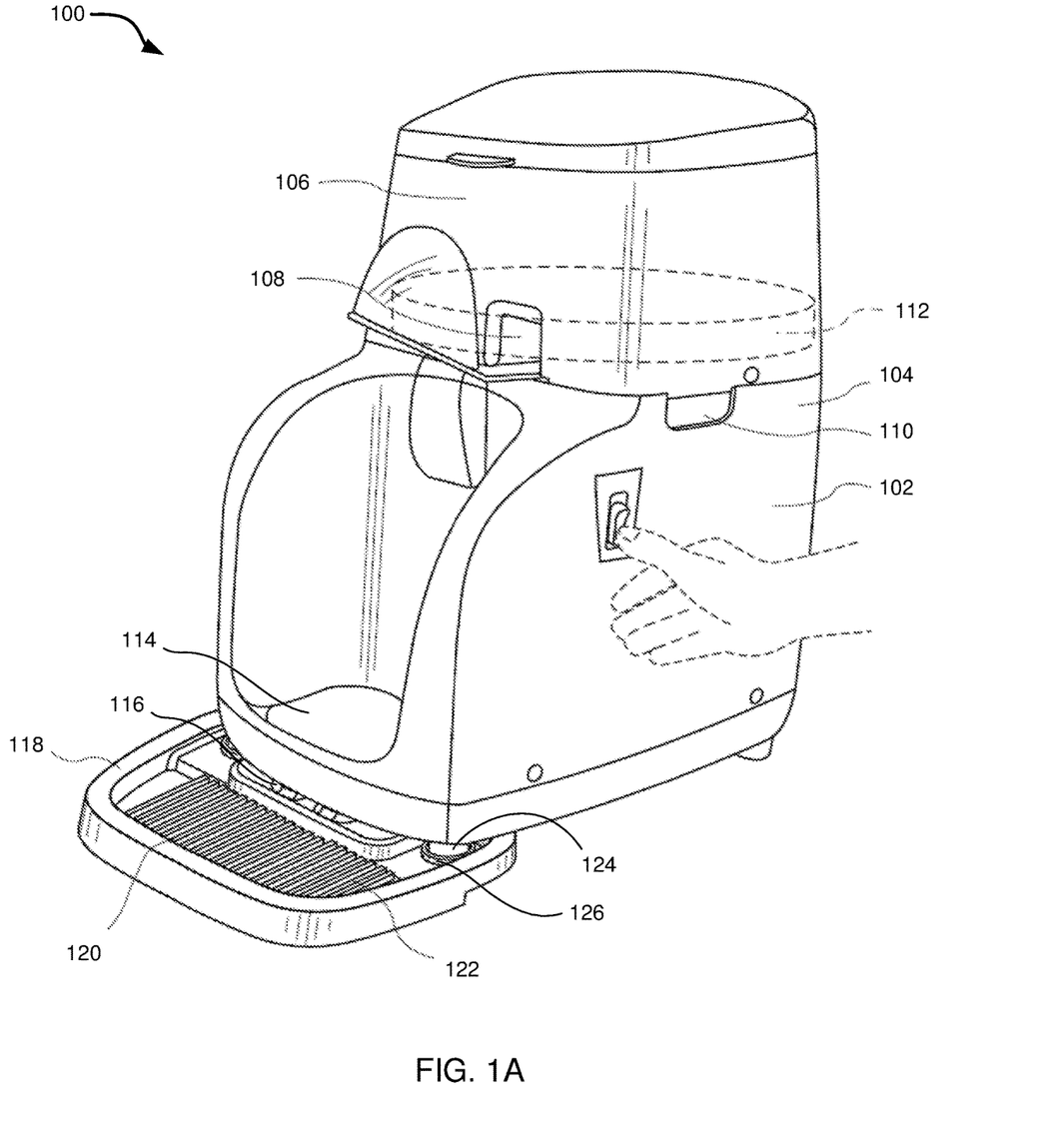
FIG. 1A is a perspective view of a frozen confection machine including a drip tray and heat sink, in accordance with the principles and teachings of the disclosure.
Figure 1B:
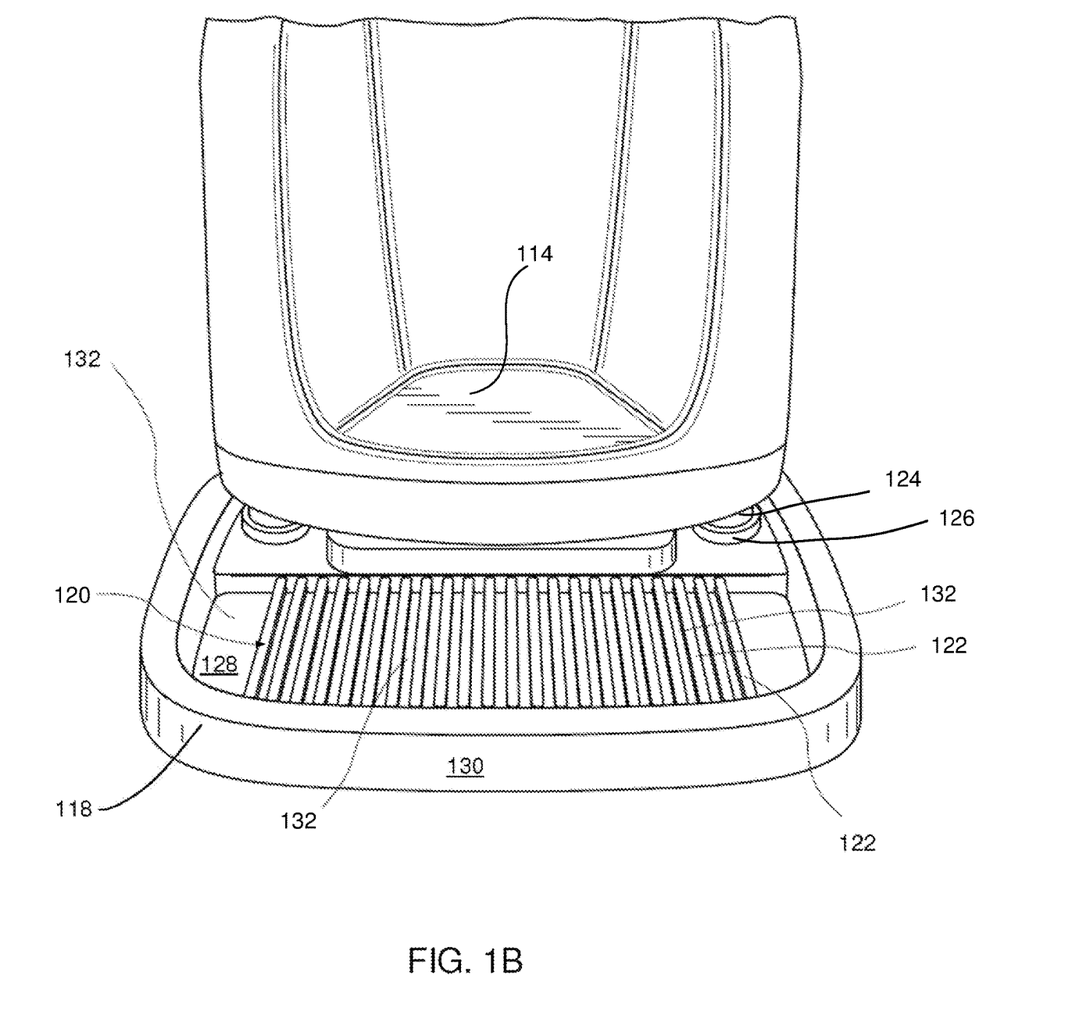
FIG. 1B is a front perspective view of a drip tray including a heat sink, and further illustrates a portion of a housing of a frozen confection machine, in accordance with the principles and teachings of the disclosure.

Referring now to the figures, FIG. 1A is a perspective view of a frozen confection machine 100. FIG. 1B is a front perspective view of the drip tray and heat sink portion of the frozen confection machine 100 as illustrated in FIG. 1A. The frozen confection machine 100 is configured to condition ice into a fluffy or snow-like texture and appearance that is suitable for use in a frozen confection such as a snow cone or shaved ice dessert. In an embodiment, the frozen confection machine 100 is similar to that described in U.S. Pat. No. 6,908,053 to Rupp, the entire contents of which are hereby incorporated by this reference herein in its entirety, with modifications and additions as described herein. It will be appreciated that the disclosure may also be implemented with other frozen confection machines, including those described in U.S. Pat. No. 8,939,389; and U.S. Patent Application Publication No. 2015/0267955, the entire contents of which are hereby incorporated by this reference herein in their entireties, with modifications and additions as described herein.

The frozen confection machine 100 includes an outer housing 102 defining an enclosed space with a columnar portion having a blade assembly 112 disposed under an upper ice chamber 106 with a motor (see 240) disposed underneath for operation. A spout 108 for directing shaved ice from the blade assembly 112 is disposed on a front side of the housing 102 above a second drip tray 118 for catching stray ice shavings. In an embodiment, the spout 108 includes a dome shape that is suitable for shaping shaved ice within a cup or other container. The second drip tray 118 is located underneath the spout 108 such that the second drip tray 118 collects unused ice shavings that have been collected in the cup or other container.

The frozen confection machine 100 includes a first drip tray 114 disposed underneath the spout 108. The first drip tray 114 may be a surface located directly underneath the spout 108 for collecting stray ice shavings that are not collected by a cup or other container. In an embodiment, the first drip tray 114 includes a hole or cavity where melted ice or stray ice shavings can exit the first drip tray 114. In an embodiment, tubing may be connected to the hole disposed within the first drip tray 114 such that melted ice can travel through the tube and exit at some external location. In an embodiment, the tubing connected to the hole disposed within the first drip tray 114 exits to a second drip tray 118 or heat sink 120. In the example embodiment illustrated in FIG. 1A, the tubing 116 provides fluid communication between the first drip tray 114 and the second drip tray 118.

The frozen confection machine 100 includes one or more feet 124 for supporting the frozen confection machine 100. In an embodiment, a heat sink assembly or second drip tray 118 includes corresponding connection ports 126 or cavities where the feet 124 can be disposed therethrough. In such an embodiment, the heat sink assembly or second drip tray 118 is secured in place by disposing the feet of the frozen confection machine 124 through the corresponding connection ports 126 or cavities in the second drip tray 118.

In an embodiment, the frozen confection machine 100 includes tubing 116 providing fluid communication between the first drip tray 114 and the second drip tray 118. The tubing 116 may be connected to a hole disposed in the first drip tray 114. The tubing 116 may be situated such that a fluid is collected at the hole disposed in the first drip tray 114 and is emptied at the second drip tray 118.

The second drip tray 118 serves as an additional drip tray for collecting stray ice shavings or melted ice. The second drip tray 118 may alternatively be referred to as a heat sink assembly in alternative embodiments. In an embodiment, the second drip tray 118 serves as both a collection area for stray ice shavings and further serves as a heat sink for collecting cool air and pulling the cool air to the motor 240 to cool the motor 240. The second drip tray 118 may include a heat sink 120 that is separate and removable from the second drip tray 118. The second drip tray 118 may be a single piece of material that serves as a drip tray and a heat sink.

In an embodiment, the second drip tray 118 is in contact with a heat sink 120. The heat sink 120 may be formed as a body that is in contact with the second drip tray 118 and adjusts its temperature thereto by conductive heat transfer. A series of fins 122 may be disposed on the body to allow for airflow therethrough and to increase surface area contact of retained ice shavings. In the depicted embodiment, a channel 132 allows melting water to pass to a drain formed in the front bottom portion of heat sink 120. The heat sink 120 may be integrated or integrally formed with the tray and may be finned or have other structures to increase thermal transfer. It will be appreciated that the heat sink 120 and second drip tray 118 may be formed as a unitary member to increase thermal transfer. The heat sink 120 and second drip tray 118 may be constructed of suitable thermally conductive materials, including metal and metal alloys, such as aluminum, magnesium and zinc.

In an embodiment, the heat sink 120 includes flecks or small pieces of a thermally conductive material that are disposed throughout the second drip tray 118. In such an embodiment, the second drip tray 118 may be constructed of a polycarbonate material such as an injection molded plastic. The second drip tray 118 may include small pieces of a thermally conductive material, such as a metal or metal alloy, that are sprinkled throughout the polycarbonate material of the second drip tray 118. In such an embodiment, the second drip tray 118 is constructed of polycarbonate material with a metal or metal alloy disposed throughout the polycarbonate material. In an embodiment, the second drip tray 118 is constructed of polycarbonate with an aluminum alloy. The thermally conductive pieces disposed throughout the second drip tray 118 may be cooled by the stray ice shavings collecting in the second drip tray 118.

In an embodiment, the heat sink 120 is constructed of one or more solid pieces of a thermally conductive material such as a metal or metal alloy. The heat sink 120 may be removably or securely attached to the second drip tray 118. In an embodiment, the heat sink 120 forms the second drip tray 118 itself such that the heat sink 120 and the second drip tray 118 do not constitute two separate components of the frozen confection machine 100 but instead constitute a single piece of material that serves as a heat sink and as a collector of stray ice shavings.

In an embodiment, the second drip tray 118 includes a collection surface 128 disposed on the top of the second drip tray 118. The collection surface 128 stands parallel or approximately parallel with a surface on which the frozen confection machine 100 stands. The second drip tray 118 may further include a lip 130 at the perimeter of the collection surface 128. The lip 130 serves to ensure that most of the stray ice shavings within the second drip tray 118 remain on the collection surface 128 and do not fall on to the ground or other surface.

In an embodiment, the heat sink 120 is attached to the collection surface 128 of the second drip tray 118 and extends to an interior side of the lip 130 on one or more sides. In an embodiment such as that illustrated in FIG. 1B, the heat sink 120 extends to the lip 130 on two sides, including a side proximal to the motor of the frozen confection machine 100 and a side distal from the motor of the frozen confection machine 100. The heat sink 120 may extend vertically to a same height as the lip 130 or may have a lesser height than the lip 130 such that the lip 130 stands higher than a top of the heat sink 120.

In an embodiment, the heat sink 120 has an area equal to or approximately equal to the area of the collection surface 128 of the second drip tray 118. In an embodiment, the heat sink 120 has an area smaller than the area of the collection surface 128 of the second drip tray 118. In an embodiment, the heat sink 120 has an area approximately 50% the area of the collection surface 128 of the drip tray. In an embodiment, the heat sink 120 has an area approximately 60% the area of the collection surface 128 of the drip tray. In an embodiment, the heat sink 120 has an area approximately 70% the area of the collection surface 128 of the drip tray. In an embodiment, the heat sink 120 has an area approximately 80% the area of the collection surface 128 of the second drip tray 118. In an embodiment, the heat sink 120 has an area approximately 90% the area of the collection surface 128 of the drip tray. In an embodiment, the heat sink 120 has an area approximately 100% the area of the collection surface 128 of the drip tray.

In an embodiment, the heat sink 120 is not a separate piece of material but instead constitutes flecks or small pieces of a thermally conductive material that are spread throughout the second drip tray 118. In such an embodiment, the heat sink 120 may be described as having an area approximately equal to at least the area of the collection surface 128 of the second drip tray 118.

Figure 2:
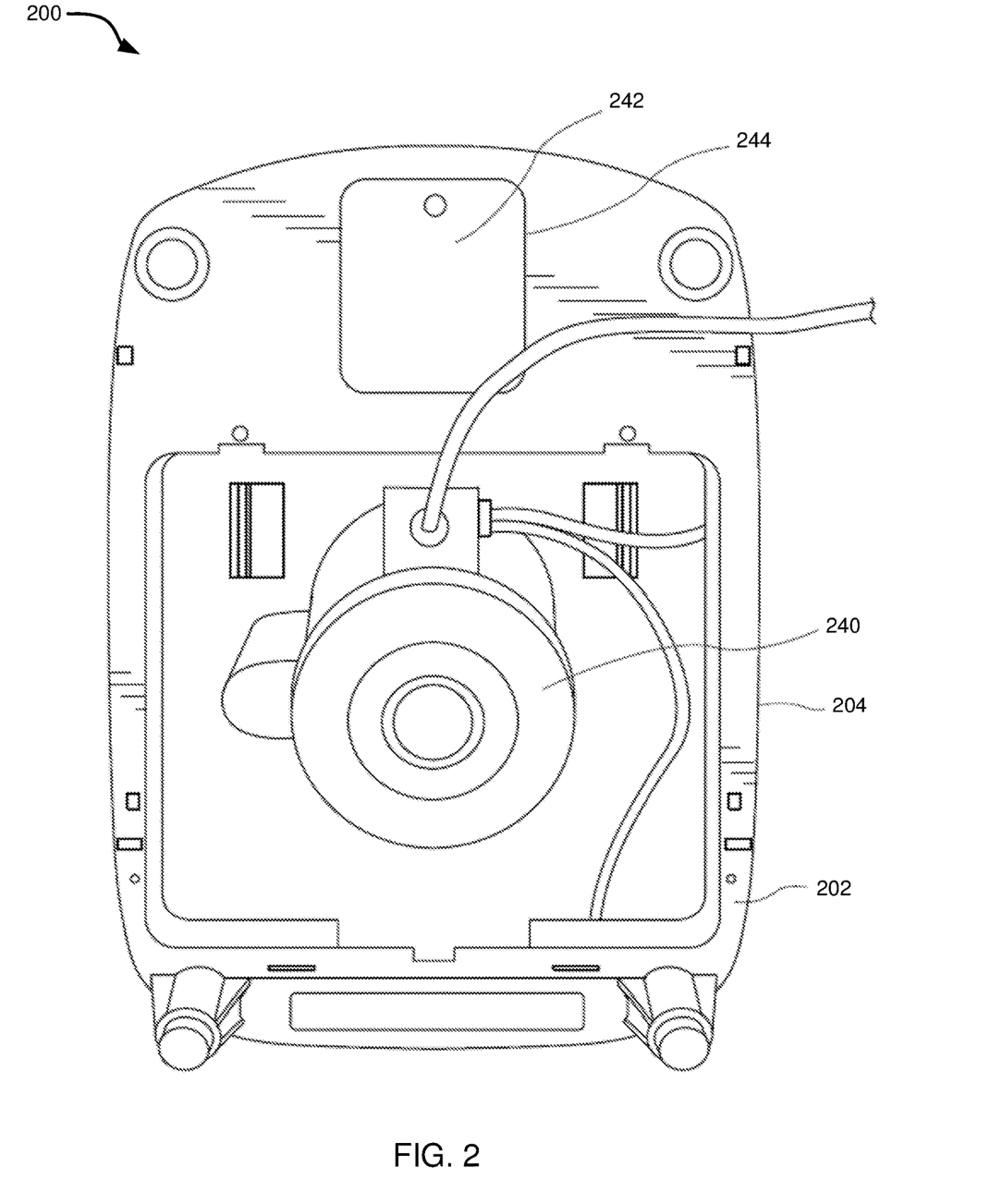
FIG. 2 is an open underside view of a frozen confection machine, in accordance with the principles and teachings of the disclosure.

A first air intake 242 may be formed as an opening 244 in the housing wall 204 at a position allowing airflow to pass over the bottom surface of the heat sink 120 and into the housing body 202. One or more air outlets 110 may also be disposed on the housing walls 104. The air outlets 110 are configured for permitting hot air generated by the motor 240 to escape the outer housing 102. Additionally, the air outlets 110 are configured for permitting cooled airflow that has passed over the motor 240 to exit the outer housing 102.

Figure 3:
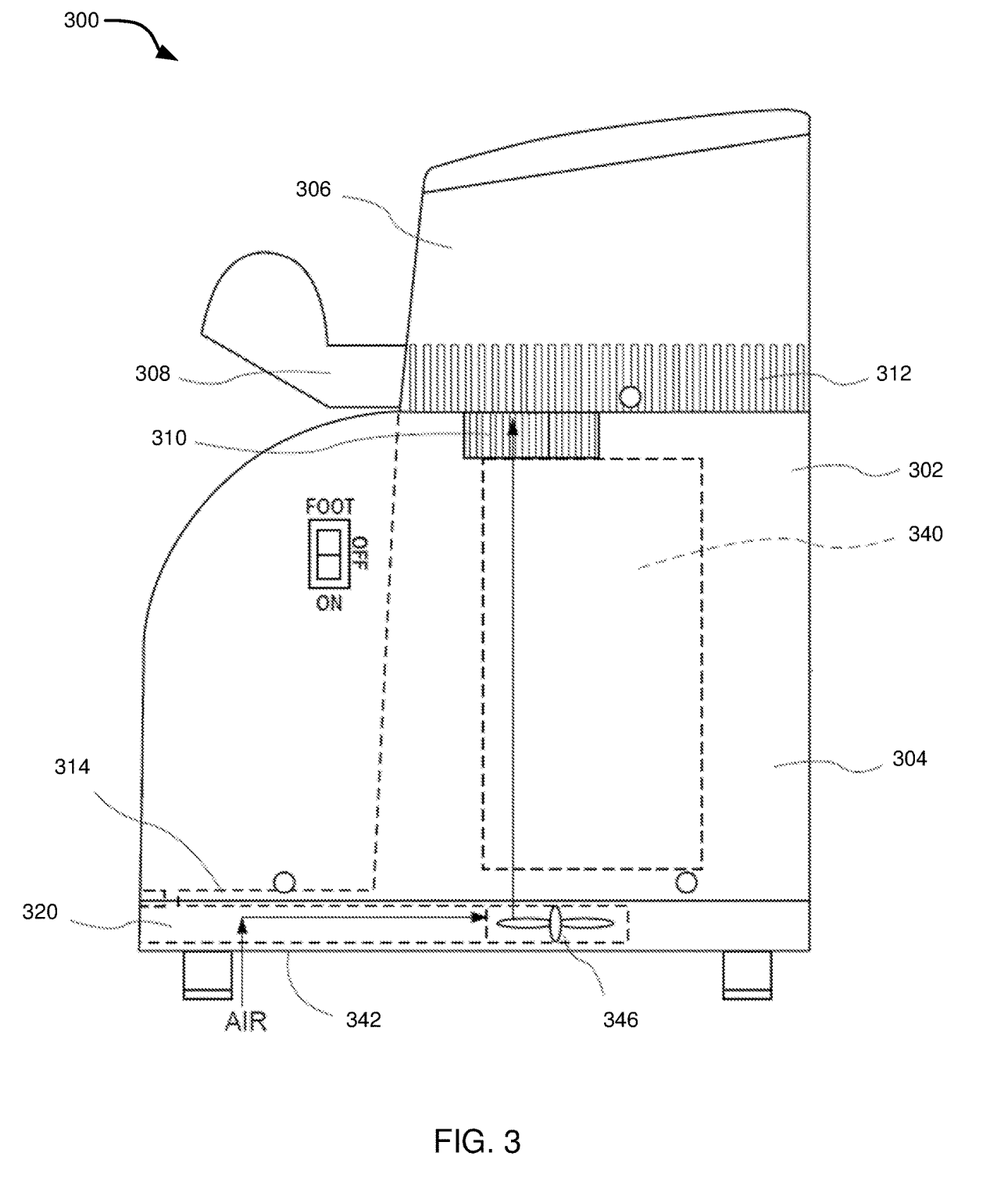
FIG. 3 is a sectional side view of a frozen confection machine including a fan assembly and a pathway for directing air through the housing of the frozen confection machine, in accordance with the principles and teachings of the disclosure.

Turning to FIG. 3, another view of a frozen confection machine 300 is depicted. A pathway for airflow is through the housing 302 may be defined as beginning at the air intake 318 and proceeding to one or more air outlets 310. As shown by the arrows indicating airflow in FIG. 3, air may pass into the housing through intake 318, across the heat sink 320 (which may possess fins) and past the motor 240 to exit the housing via the one or more air outlets 310. In the depicted embodiment, the airflow may pass on the opposite sides of the motor 240 as it rises through the housing 302 to the one or more air outlets 310.

During use, the airflow is cooled as it passes across the heat sink 320, the cooled air passing by the motor 240 can thereby cool the motor 240. Airflow may be generated passively by convection as air in the housing is heated by the motor during use, causing the warmer air to rise and exit the housing via the one or more air outlets 310, and fresh air to be drawn in the inlet 318 and cooled by the heat sink 320.

Continuing with FIG. 3, this depicted illustrative embodiment of the frozen confection machine 300 has an outer housing 302 defining an enclosed space with a columnar portion having a blade assembly 312 disposed under an upper ice chamber 306 with a motor 240 disposed underneath for operation. A spout 308 for directing shaved ice from the blade assembly 312 is disposed on a front side of the housing 302 over a first drip tray 314 for catching stray ice shavings.

As depicted in FIGS. 1A-1B, second drip tray 118 is in thermally conductive contact with a heat sink 120. The heat sink 120 may be formed as a body that is in contact with the second drip tray 118 and adjusts its temperature thereto by heat transfer. A series of fins 122 may be disposed on the body to allow for airflow therethrough and to increase the surface area of heat sink 120.

FIG. 2 illustrates a perspective view of an underside of a frozen confection machine 200. The frozen confection machine 200 includes a housing 202 and one or more housing walls 204. The frozen confection machine 200 includes a motor 240 for actuating the blade assembly (see 112). The underside of the housing 202 includes a first air intake 242. The first air intake 242 may be formed as an opening 244 in the housing 202 at a position allowing airflow to pass over the heat sink (see 120) and into the housing body. In the embodiment shown in FIG. 2, the first air intake 242 is disposed on a lower surface of the housing 202. The housing 202 may further include one or more air outlets disposed in the housing walls 204.

FIG. 3 is a sectional side view of a frozen confection machine 300. As shown in FIG. 3, there may be provided a pathway for airflow from the heat sink 320 and through the motor 340. The frozen confection machine 300 includes an outer housing 302, one or more housing walls 304, an ice chamber 306, a spout 308, one or more air outlets 310, a blade assembly 312, a first drip tray 314, a heat sink 320, a motor 340, a first air intake 342, and a fan assembly 346. In the embodiment illustrated in FIG. 3, the fan assembly 346 is located inline and below the motor 340. The fan assembly 346 is configured to draw air in from the heat sink 320, into the housing 302, and up through the motor 340. The cool airflow drawn in from the heat sink 320 can cool the motor 340 to extend the life of the motor 340. Additionally, passing cool airflow through the housing 302 can reduce the likelihood that ice within the ice chamber 306 will melt prematurely during use.

In an embodiment, the pathway for airflow through the housing 302 may be defined as beginning at the first air intake 342 and proceeding to the one or more air outlets 310. As shown by the arrows indicating airflow in FIG. 3, air may pass into the housing through the first air intake 342, across the heat sink 320 (which may possess fins) and past the motor 340 to exit the housing via the one or more air outlets 310. In the depicted embodiment, the airflow may pass across at least one side of the motor 340 as it rises through the housing 302 to the one or more air outlets 310.

During use, the airflow is cooled as it passes across the heat sink 320, the cooled air passing by the motor 340 can thereby cool the motor. The fan assembly 346 may be actuated to generate the airflow to cool the motor. While not depicted, where appropriate, suitable ducting or baffling members may be disposed in the housing to direct airflow as may be desired for efficient cooling. The fan assembly 346 may be powered by the motor 340 using a suitable linkage or may contain a separate smaller motor. In an embodiment, the fan assembly 346 is powered by a separate smaller motor and the separate smaller motor is disposed in the cavity creating the first air intake 342.

Figure 4:
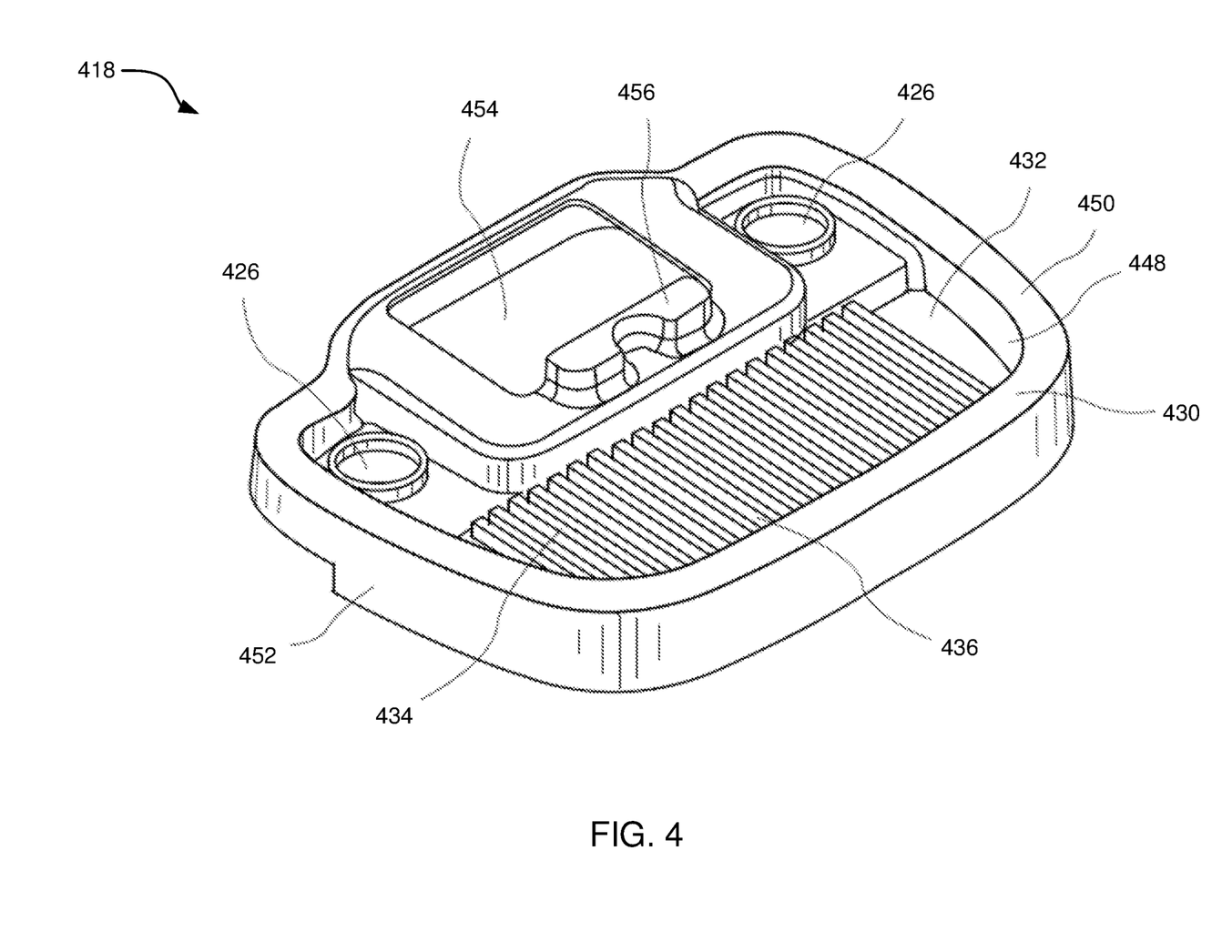
FIG. 4 is a perspective view of an integrated drip tray and heat sink assembly for a frozen confection machine, in accordance with the principles and teachings of the disclosure.

FIG. 4 is a perspective view of a second drip tray 418 with integrated heat sink 420. The second drip tray 418 includes a channel 432 defined by a surrounding inner sidewall 448. The integrated heat sink 420 portion of the second drip tray 418 includes a series of upper fins 434 separated by lower fins 436 that define flow channels towards a drain formed as a hole passing through the lip 430. A channel 432 may be formed inside the inner sidewall 448 to direct the flow of melting ice and water. The lip 430 may be formed with a sufficient thickness to serve as a heat sink. As depicted, the inner sidewall 448 may extend to an upper surface 450 and then continue downwards as an outer sidewall 452.

The integrated lip 430 may further include structures for connection to an ice shaver and to facilitate airflow during use. For example, a fan connection port 454 may be disposed through the body of the second drip tray 418 near a rear surface, and one or more alignment ridges 456 and connection ports 426 allow connection to a frozen confection machine such as those illustrated in FIGS. 1A-1B, 2, and 3.

Figure 5:
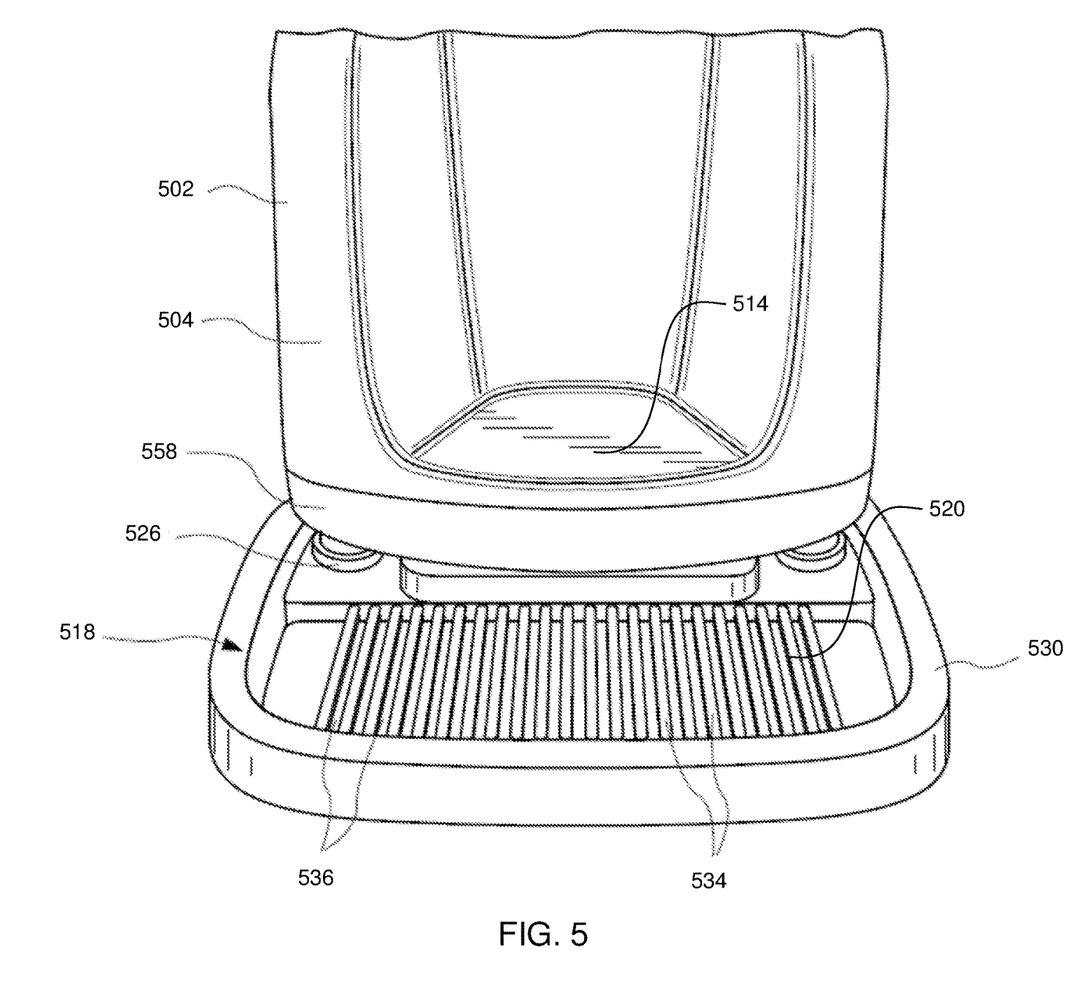
FIG. 5 is a front perspective view of an integrated drip tray and heat sink assembly, and further illustrates a portion of a housing of a frozen confection machine that is in mechanical contact with the integrated drip tray and heat sink assembly, in accordance with the principles and teachings of the disclosure.

FIG. 5 is a perspective view of a second drip tray 518 with integrated heat sink 520 installed on a housing 502 of a frozen confection machine. The housing 502 includes one or more housing walls 504. The housing 502 further includes a bottom plate 558 and a first drip tray 514. The second drip tray 518 with integrated heat sink 520 includes one or more connection ports 526 where a foot of the bottom plate 558 can be disposed therethrough. The second drip tray 518 includes a lip 530 disposed around a perimeter of the second drip tray 518. The integrated heat sink 520 of the second drip tray 518 includes upper fins 534 and lower fins 536.

In an embodiment, the second drip tray 518 with integrated heat sink 520 is mechanically connected to the housing 502 of a frozen confection machine. In an embodiment, the first drip tray 514 is integrated in the housing 502 of the frozen confection machine is located underneath the spout 118 where shaved ice exits the frozen confection machine. The second drip tray 518 may be located underneath the housing 502, may be located at a front side of the housing 502 where the spout 108 represents the front side of the housing, may be located at a rear side of the housing 502, or may be located underneath the housing 502. In an embodiment, the second drip tray 518 is located underneath the housing 502 and has a surface area that is greater than an area of the underside of the housing 502. In an embodiment, the second drip tray 518 is located underneath the spout 108 such that the second drip tray 518 collects conditioned ice that has exited the frozen confection machine but has not been collected in a cup or other container. In an embodiment, the second drip tray 518 is located under the spout 108 and further extends forward relative to the spout 108 (as shown in FIG. 5).

Figure 6:
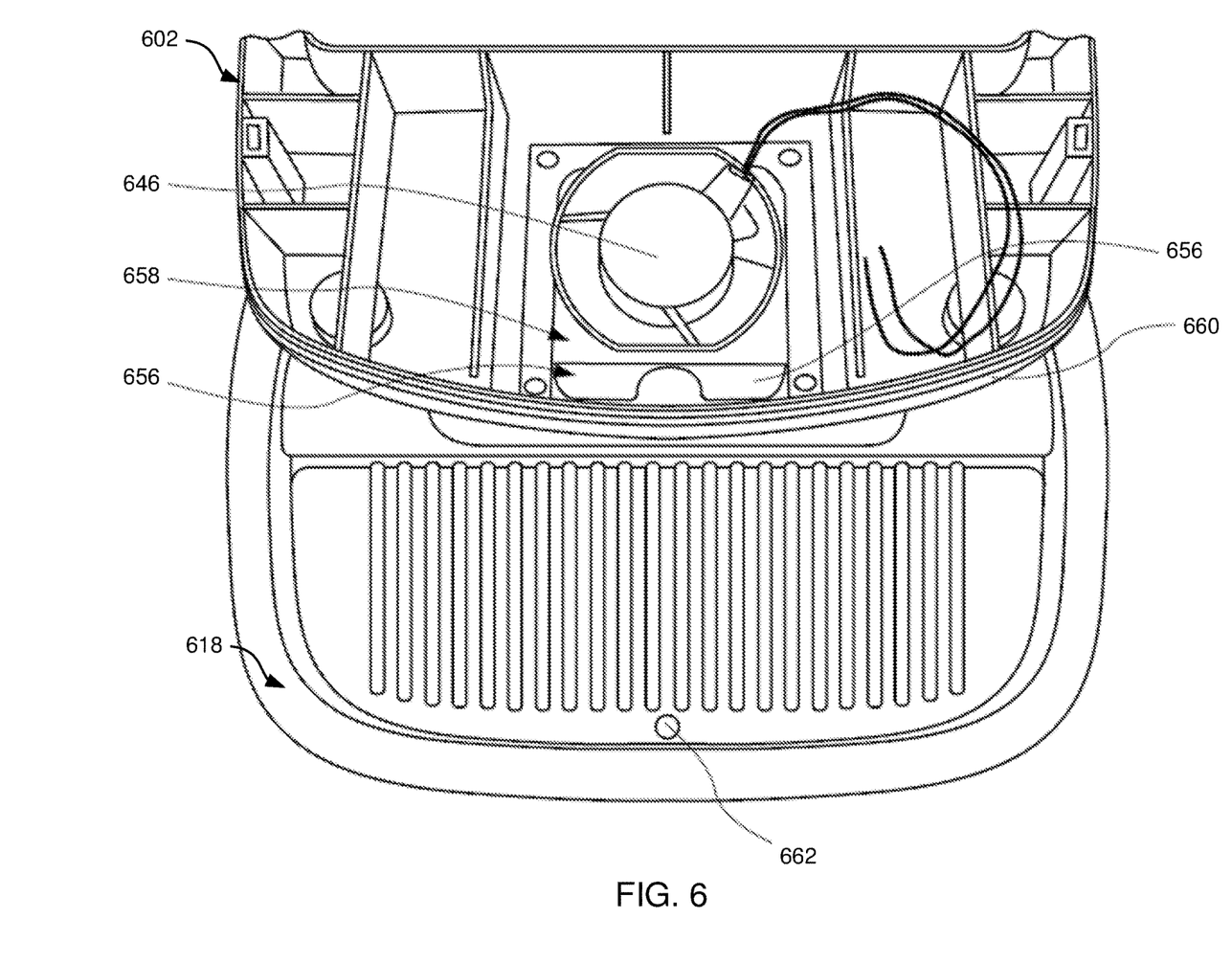
FIG. 6 is a sectional aerial view of a frozen confection machine including a drip tray with a heat sink assembly, in accordance with the principles and teachings of the disclosure.

FIG. 6 is an aerial view of the second drip tray 618 with integrated heat sink 620 and further illustrates a sectional view of a portion of the housing 602 of a frozen confection machine. As shown in FIG. 6, a fan assembly 646 is positioned to draw cooled air into the housing of the frozen confection machine. The fan assembly 646 may include a separate motor for driving a fan to draw air into the housing and to push the air through the housing such that the cool air can cool the motor (see 240) of the frozen confection machine. In an embodiment, the fan assembly 646 draws power from the same motor (see 240) that is configured for actuating a drive shaft that can cause a blade assembly 112 or paddle of a blade assembly 112 to turn and thereby condition ice. The fan assembly 646 may be attached to the housing 602 and/or the second drip tray 618 by way of a fan connection port 658.

The housing 602 of the frozen connection machine is in mechanical contact with the second drip tray 618. In an embodiment, the housing 602 of the frozen confection machine is attached to the second drip tray 618 with one or more alignment ridges 656. The housing 602 may further be held in mechanical contact with the second drip tray 618 by way of one or more alignment tabs 660.

In an embodiment as illustrated in FIG. 6, the second drip tray 618 with integrated heat sink further includes a fluid outlet 662. The fluid outlet 662 may include threading or ribbing whereby tubing can be connected to the fluid outlet 662 to permit melted ice to be drawn away from the frozen confection machine to an external location. The fluid outlet 662 may be a hole or tubing disposed in the second drip tray 618 to permit conditioned ice and/or melted ice to exit the frozen confection machine.

Figure 7:
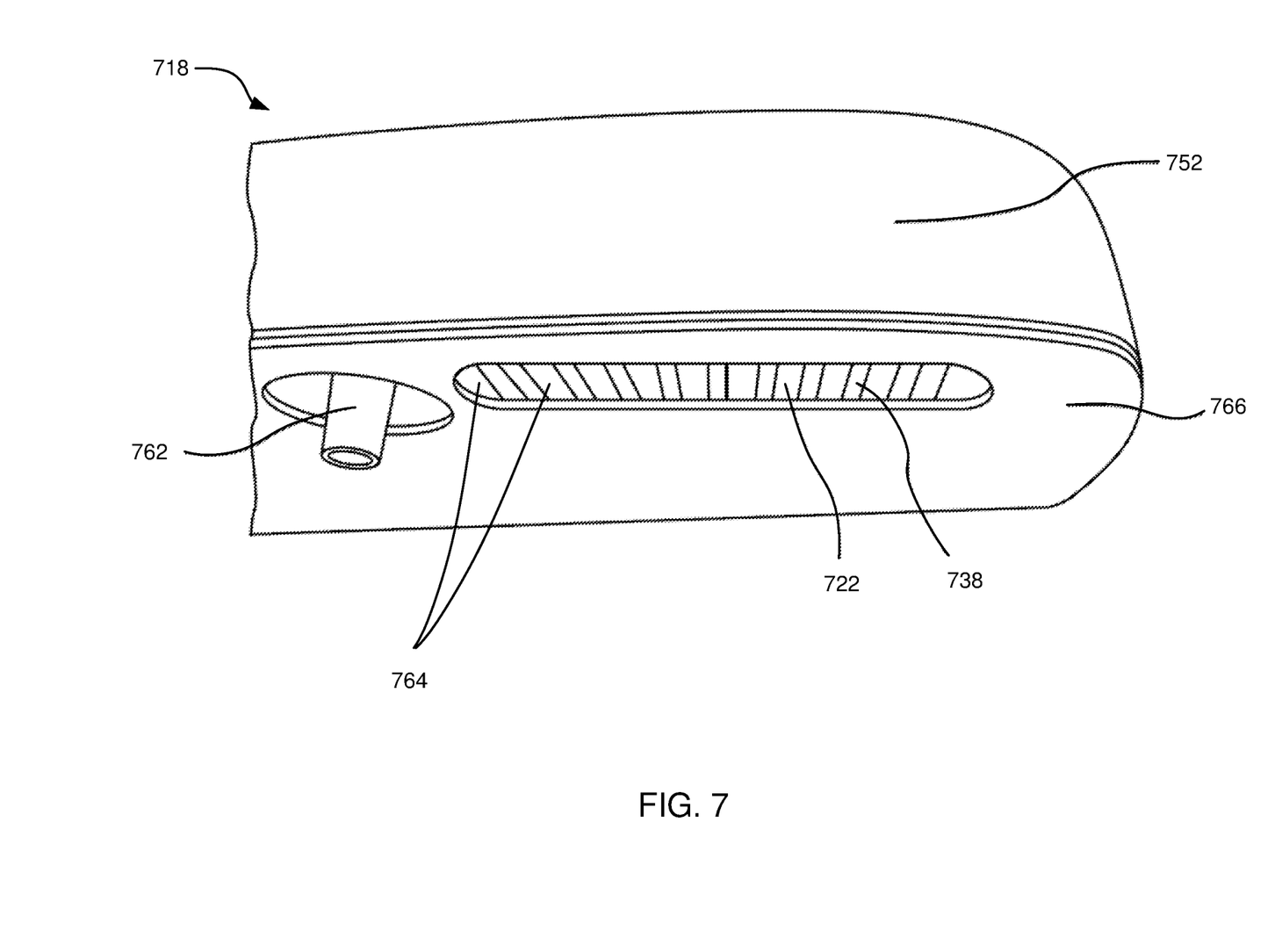
FIG. 7 is an underside perspective view of a drip tray assembly including air inlets and outlets and a heat sink, in accordance with the principles and teachings of the disclosure.

FIG. 7 is a bottom perspective view of a second drip tray 718 with integrated heat sink. In the embodiment illustrated in FIG. 7, there is a post or support member 762 for supporting the fan assembly 646. The support member 762 may be attached to an underside of the fan assembly 646 to support the fan assembly 646 and prevent the fan assembly 646 from contacting the heat sink. In an embodiment, the support member 762 is attached to the housing of a frozen confection machine and further provides a means to mechanically connect the housing with the second drip tray 718.

The underside of the second drip tray 718 may include a plurality of airflow inlet/outlets 764. The second drip tray 718 further includes a heat sink comprising a plurality of fins 722 that form a lower heat exchange surface 738 on the underside of the hat sink. The second drip tray 718 includes an outer sidewall 752 and a lower plate 766. The lower plate 766 may be used to close the lower airflow area of the integrated drip tray and heat sink.

In an embodiment, a pathway for cooling airflow may be defined as beginning at an air intake in a housing of the frozen confection machine. The pathway for cooling airflow may extend across the integrated drip tray and heat sink such that the airflow moves passed the upper fins and lower fins of the heat sink. The cooling air may be drawn through the pathway by way of a fan assembly. The fan assembly may draw air in through an air inlet/outlet of the housing and may further push the air through the housing and through the motor. The fan assembly may further push the air such that the air exits the housing through an air outlet.

Figure 8:
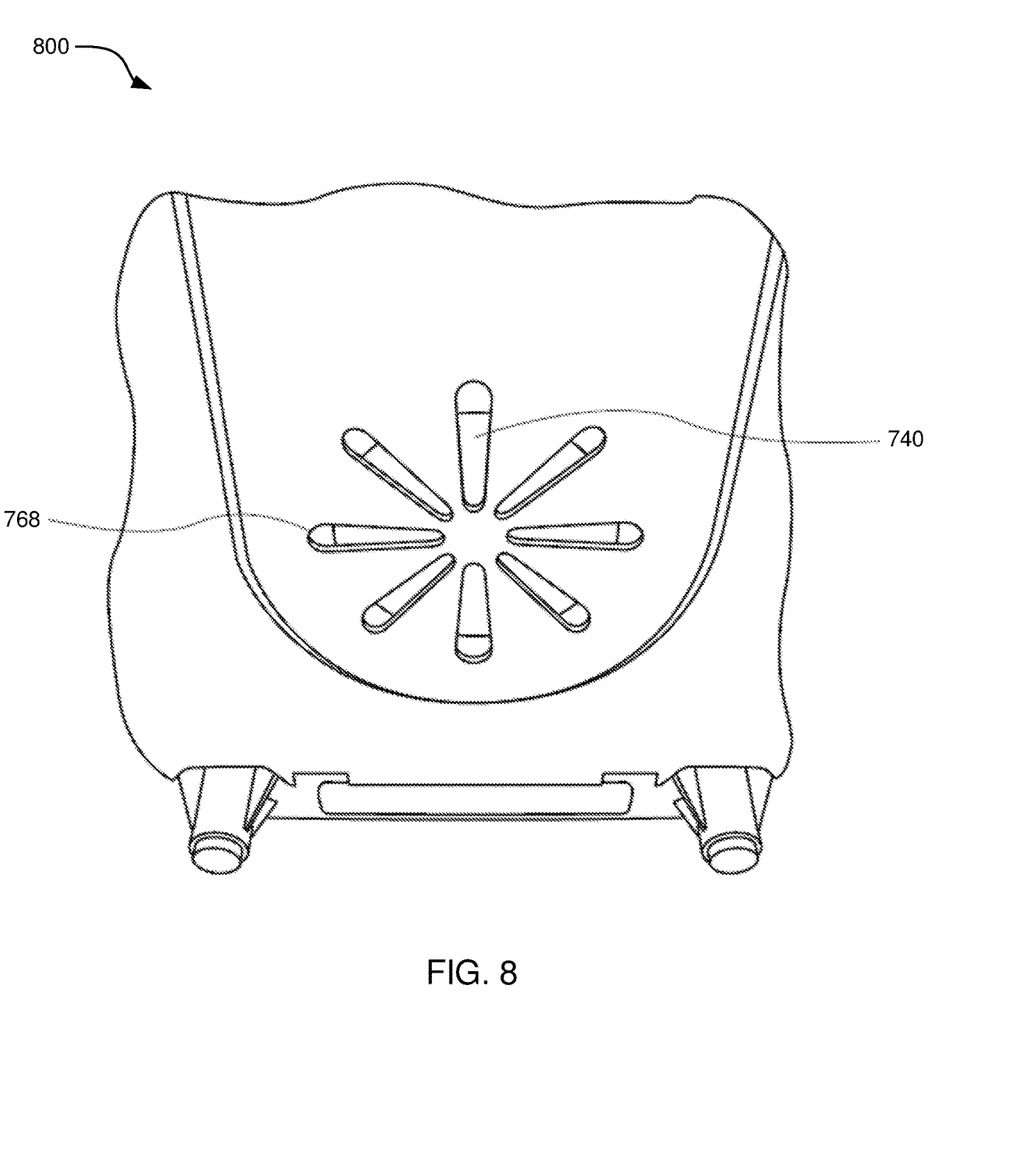
FIG. 8 is a closed underside view of a frozen confection machine, in accordance with the principles and teachings of the disclosure.

FIG. 8 is a closed bottom view of a frozen confection machine 800. The frozen confection machine includes a housing that comprises one or more air inlets/outlets 768 whereby airflow can pass into and out of the housing of the frozen confection machine. The air inlets/outlets 768 may include channels or holes disposed in the housing of the frozen confection machine. The air inlets/outlets 768 may be located at or near the motor 740 as shown in FIG. 8. The motor 740 may be configured for turning a drive shaft, and the drive shaft may be in mechanical contact with a paddle of a blade assembly or a blade of a blade assembly. The motor 740 can be actuated for the purpose of conditioning ice with one or more blades.

In an embodiment, a frozen confection machine includes a drip tray (such as the second drip tray 118 as discussed herein) with an integrated heat sink. This may be referred to as an integrated heat sink and drip tray. The integrated heat sink and drip tray may be constructed of suitable thermally conductive materials, including metals, metal alloys, and/or polycarbonates with metals or metal alloys disposed therein. In some exemplary embodiments it may be injection molded from suitable materials having appropriate thermoconductive properties. One such material may be a plastic material or other polymer mixed with a thermally conductive material to thereby increase the thermal conduction properties. For example, an aluminum oxide powder mixed in appropriate quantities with polycarbonate particles can be used as the raw material for injection molding an integrated drip tray and heat sink that has suitable thermal conductive properties.

EXAMPLES

The following examples pertain to further embodiments.

Example 1 is a frozen confection machine. The frozen confection machine includes a blade assembly for shaving ice and a housing comprising an air inlet and an air outlet. The frozen confection machine includes a motor attached to a drive shaft for bringing ice into contact with the blade assembly, wherein the motor is disposed in the housing, a drip tray, and a heat sink in mechanical contact with the drip tray. The frozen confection machine further includes a fan assembly that causes airflow to move into the housing across the heat sink and past the motor for cooling the motor.

Example 2 is a frozen confection machine as in Example 1, wherein the heat sink is integrated with the drip tray as a unitary structure.

Example 3 is a frozen confection machine as in any of Examples 1-2, wherein the integrated drip tray and heat sink comprises outward facing fluted surfaces.

Example 4 is a frozen confection machine as in any of Examples 1-3, wherein the outward facing fluted surfaces of the integrated drip tray and heat sink comprises a plurality of parallel ridges separated by a plurality of grooves that define flow paths for melting ice.

Example 5 is a frozen confection machine as in any of Examples 1-4, wherein the integrated drip tray and heat sink is formed from a polycarbonate material with aluminum oxide dispersed therethrough.

Example 6 is a frozen confection machine as in any of Examples 1-5, wherein the air inlet is part of a pathway for airflow, wherein the air inlet is defined by at least one opening disposed in a plate underneath the integrated drip tray and heat sink that defines a lower side of an airflow passage.

Example 7 is a frozen confection machine as in any of Examples 1-, wherein the fan assembly is disposed in the housing to create airflow through the airflow passage when actuated.

Example 8 is a frozen confection machine as in any of Examples 1-7, wherein the air inlet comprises at least a first air inlet that is located near the heat sink at a lower portion of the housing; and wherein the air outlet comprises at least a first air outlet that is located at an upper portion of the housing, such that airflow is passively created by convection during use.

Example 9 is a frozen confection machine as in any of Examples 1-8, wherein the drip tray is disposed underneath a spout where ice shavings generated by the blade assembly are dispensed, such that the drip tray catches stray ice shavings from the spout.

Example 10 is a frozen confection machine. The frozen confection machine includes a blade assembly for shaving ice, a housing comprising an air inlet and an air outlet, and a motor attached to a drive shaft for bringing ice into contact with the blade assembly, wherein the motor is disposed in the housing. The frozen confection machine further includes a spout for dispensing ice shavings produced by the blade assembly and a drip tray comprising thermo-conductive properties that is in mechanical contact with the housing and located underneath the spout, the thermo-conductive drip tray comprising a lower cooling surface. The frozen confection machine further includes a fan assembly that causes airflow to move into the housing across the heat sink and past the motor for cooling the motor.

Example 11 is a frozen confection machine as in Example 10, wherein at least a portion of the upper surface of the thermo-conductive drip tray comprises a plurality of parallel ridges separated by a plurality of grooves that define flow paths for melting ice.

Example 12 is a frozen confection machine as in any of Examples 10-11, wherein the lower cooling surface of the thermo-conductive drip tray comprises a series of fins in a pathway for airflow.

Example 13 is a frozen confection machine as in any of Examples 10-12, wherein the thermo-conductive drip tray is formed from a polycarbonate material with aluminum oxide dispersed therethrough.

Example 14 is a frozen confection machine as in any of Examples 10-13, wherein the machine further comprises a lower plate disposed under the thermo-conductive drip tray, such that at least a portion of the air inlet is defined as the space between the lower cooling surface and the lower plate.

Example 15 is a frozen confection machine as in any of Examples 10-14, wherein the air inlet forms at least a part of a pathway for airflow and is defined by at least one opening disposed in the lower plate.

Example 16 is a frozen confection machine as in any of Examples 10-15, wherein the fan assembly is disposed in the housing to create airflow through the airflow passage when actuated.

Example 17 is a method of cooling a motor of a frozen confection machine during operation. The method includes collecting ice particles dispensed from a spout with a drip tray that is in mechanical contact with a heat sink of the frozen confection machine, thereby cooling the heat sink. The method includes generating an airflow across the heat sink to produce a cooled airflow. The method includes passing the cooled airflow across a motor of the frozen confection machine to thereby cool the motor.

Example 18 is a method as in Example 17, wherein generating an airflow across the heat sink to produce a cooled airflow comprises passing air across a plurality of fins located on the heat sink.

Example 19 is a method as in any of Examples 17-18, wherein generating an airflow across the heat sink to produce a cooled airflow comprises actuating a fan assembly in the frozen confection machine.

Example 20 is a method as in any of Examples 17-19, wherein actuating the fan assembly causes the airflow to move into the housing across the heat sink, such that the cooled airflow moves past the motor thereby cooling the motor.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A frozen confection machine comprising:
   a blade assembly for shaving ice;
   a housing comprising an air inlet and an air outlet;
   a motor attached to a drive shaft for driving the blade assembly, wherein the motor is disposed in the housing;
   a drip tray comprising a heat sink; and
   a fan assembly that causes airflow from outside the housing to enter the air inlet, move past a surface of the heat sink into the housing and past the motor for cooling the motor.

2. The frozen confection machine of claim 1, wherein the heat sink is integrated with the drip tray as a unitary structure.

3. The frozen confection machine of claim 2, wherein the integrated drip tray and heat sink comprises outward facing fluted surfaces.

4. The frozen confection machine of claim 3, wherein the outward facing fluted surfaces of the integrated drip tray and heat sink comprises a plurality of parallel ridges separated by a plurality of grooves that define flow paths for melting ice.

5. The frozen confection machine of claim 2, wherein the integrated drip tray and heat sink is formed from a polycarbonate material with aluminum oxide dispersed therethrough.

6. The frozen confection machine of claim 2, wherein the air inlet is part of a pathway for airflow, wherein the air inlet is defined by at least one opening disposed in a plate underneath the integrated drip tray and heat sink that defines a lower side of an airflow passage.

7. The frozen confection machine of claim 6, wherein the fan assembly is disposed in the housing to create airflow through the airflow passage when actuated.

8. The frozen confection machine of claim 1, wherein the air inlet comprises at least one air inlet that is located near the heat sink at a lower portion of the housing; and
   wherein the air outlet comprises at least one air outlet that is located at an upper portion of the housing, such that airflow is passively created by convection during use.

9. The frozen confection machine of claim 1, wherein the drip tray is disposed underneath a spout where ice shavings generated by the blade assembly are dispensed, such that the drip tray catches stray ice shavings from the spout.

10. A frozen confection machine comprising: a blade assembly for shaving ice; a housing comprising an air inlet and an aft outlet; a motor attached to a drive shaft for driving the blade assembly, wherein the motor is disposed in the housing; a spout for dispensing ice shavings produced by the blade assembly; a drip tray comprising thermo-conductive properties located underneath the spout, the thermo-conductive drip tray comprising a heat sink; and a fan assembly that causes airflow from outside the housing to enter the air inlet, move past a surface of the heat sink into the housing and past the motor for cooling the motor.

11. The frozen confection machine of claim 10, wherein at least a portion of the upper surface of the thermo-conductive drip tray comprises a plurality of parallel ridges separated by a plurality of grooves that define flow paths for melting ice.

12. The frozen confection machine of claim 10, wherein the lower cooling surface of the thermo-conductive drip tray comprises a series of fins in a pathway for airflow.

13. The frozen confection machine of claim 10, wherein the thermo-conductive drip tray is formed from a polycarbonate material with aluminum oxide dispersed therethrough.

14. The frozen confection machine of claim 10, wherein the frozen confection machine further comprises a lower plate disposed under the thermo-conductive drip tray, such that at least a portion of the air inlet is defined as a space between the lower cooling surface and the lower plate.

15. The frozen confection machine of claim 14, wherein the air inlet forms at least a part of a pathway for airflow and is defined by at least one opening disposed in the lower plate.

16. The frozen confection machine of claim 10, wherein the fan assembly is disposed in the housing to create airflow through an airflow passage when actuated.

17. A method of cooling a motor of a frozen confection machine during operation, the method comprising: collecting ice particles dispensed from a spout with a drip tray comprising a heat sink of the frozen confection machine, thereby cooling the heat sink; generating an airflow that causes air from outside a housing to enter an air inlet, pass by a surface of the heat sink to produce a cooled airflow; and moving the cooled airflow into the housing and past the motor of the frozen confection machine to thereby cool the motor.

18. The method of claim 17, wherein generating the airflow that causes air from outside the housing to pass by the surface of the heat sink to produce the cooled airflow comprises passing air across a plurality of fins located on the surface of the heat sink.

19. The method of claim 17, wherein generating the airflow that causes air from outside the housing to pass by the heat sink to produce the cooled airflow comprises actuating a fan assembly in the frozen confection machine.

20. The method of claim 19, wherein actuating the fan assembly causes the airflow to pass by the surface of the heat sink and move into the housing, such that the cooled airflow moves past the motor thereby cooling the motor.

* * * * *